(12) United States Patent
Leppert et al.

(10) Patent No.: US 7,775,235 B2
(45) Date of Patent: Aug. 17, 2010

(54) APPARATUS AND METHODS FOR CONTAINING A FUEL PRESSURE REGULATOR

(75) Inventors: Kevin L. Leppert, Lanexa, VA (US); Todd M. Answine, Lanexa, VA (US); David E. Cvengros, Williamsburg, VA (US)

(73) Assignee: Synerject, LLC, Newport News, VA (US)

( * ) Notice: Subject to any disclaimer, the term of this patent is extended or adjusted under 35 U.S.C. 154(b) by 377 days.

(21) Appl. No.: 11/755,976

(22) Filed: May 31, 2007

(65) Prior Publication Data

US 2008/0295898 A1  Dec. 4, 2008

(51) Int. Cl.
*F16K 31/12* (2006.01)

(52) U.S. Cl. ............................. 137/315.11; 137/315.04; 137/497

(58) Field of Classification Search ................. 137/494, 137/497, 315.04, 315.11, 375, 377
See application file for complete search history.

(56) References Cited

U.S. PATENT DOCUMENTS

| | | | |
|---|---|---|---|
| 2,059,759 A | 11/1936 | Stearns | |
| 2,068,938 A | 1/1937 | Viel | |
| 2,939,480 A | 6/1960 | Elder et al. | |
| 3,076,471 A * | 2/1963 | Salerno | 137/219 |
| 3,507,263 A | 4/1970 | Long | |
| 4,164,237 A | 8/1979 | Amey | |
| 4,204,561 A | 5/1980 | Ludwig | |
| 4,474,160 A | 10/1984 | Gartner | |
| 4,741,360 A | 5/1988 | Affeldt et al. | |
| 4,756,289 A | 7/1988 | Rock et al. | |
| 4,805,575 A | 2/1989 | De Concini et al. | |
| 4,928,729 A | 5/1990 | Hornby | |
| 5,016,594 A | 5/1991 | Hafner et al. | |
| 5,163,468 A | 11/1992 | Robinson et al. | |
| 5,303,734 A | 4/1994 | Eidsmore | |
| 5,435,345 A | 7/1995 | Robinson et al. | |
| 5,479,900 A | 1/1996 | Bodenhausen et al. | |
| 5,720,263 A | 2/1998 | Frank et al. | |
| 5,727,529 A | 3/1998 | Tuckey | |
| 5,845,621 A | 12/1998 | Robinson et al. | |

(Continued)

OTHER PUBLICATIONS

Johnston, "Choosing the Right Welding Process" [online] MD&DI [retrieved on May 8, 2007] Retrieved from the Internet, URL: http://www.devicelink.com/mddi/archive/05/09/014.html, pp. 1-4.

(Continued)

*Primary Examiner*—Kevin L Lee
(74) *Attorney, Agent, or Firm*—Cooley LLP

(57) ABSTRACT

An apparatus includes a first portion and a second portion. The first portion includes a mounting surface configured to support a mounting portion of a pressure regulator. The first portion defines a cavity configured to receive at least a portion of the pressure regulator, and an opening configured to provide fluid communication between the cavity and an area outside of the first portion. The second portion includes a mounting surface configured to support the mounting portion of the pressure regulator. The second portion defines a cavity and an opening configured to provide fluid communication between the cavity of the second portion and an area outside of the second portion. The second portion is configured to be coupled to the first portion to form a fluid-tight seal.

13 Claims, 8 Drawing Sheets

U.S. PATENT DOCUMENTS

| | | | |
|---|---|---|---|
| 5,860,447 | A | 1/1999 | Chu |
| 6,209,578 | B1 * | 4/2001 | Newton .................. 137/505.41 |
| 6,213,143 | B1 | 4/2001 | Schwegler et al. |
| 6,230,685 | B1 | 5/2001 | Kilgore et al. |
| 6,439,205 | B2 | 8/2002 | Ushigome |
| 6,619,314 | B2 | 9/2003 | Wynn, Jr. et al. |
| 6,626,150 | B2 | 9/2003 | Palma |
| 6,681,798 | B2 | 1/2004 | Bueser et al. |
| 6,688,322 | B2 | 2/2004 | Wynn, Jr. et al. |
| 2002/0179151 | A1 * | 12/2002 | van't Hoff ............. 137/505.41 |
| 2003/0024509 | A1 | 2/2003 | Matusek et al. |
| 2004/0007267 | A1 * | 1/2004 | McIntyre et al. ............ 137/494 |
| 2006/0043095 | A1 * | 3/2006 | Maholm et al. ............. 220/701 |

OTHER PUBLICATIONS

"Spin Welding Joint Design," [online] Plastic Assembly Systems [retrieved on May 7, 2007] Retrieved from the Internet, URL: http://www.heatstaking.com/technical-spin-welding-joint-design.htm.
International Search Report and Written Opinion for PCT/US2008/057333, mailed Aug. 5, 2008, 9 pages.

* cited by examiner

APPARATUS AND METHODS FOR CONTAINING A FUEL PRESSURE REGULATOR

BACKGROUND

The invention relates generally to fuel system components, and more particularly to apparatuses and methods for containing a fuel pressure regulator within a fuel line.

Fuel flow regulators, such as, for example, pressure regulators, flow rate regulators and/or dampers, are often used within fuel systems to control the characteristics of the fuel flow to an engine. For example, some known fuel pressure regulators are used to control the fuel supply pressure to the fuel injectors of an engine. Such known fuel regulators, however, are often contained within the fuel tank and/or within the fuel injector rail. Moreover, such known fuel pressure regulators are often removably contained such that the fuel pressure regulator can be removed and/or replaced. Accordingly, the containment of such known fuel pressure regulators can limit the locations within the fuel system where the fuel pressure regulator can be positioned. Additionally, the containment of such known fuel regulators can be susceptible to tampering (e.g., changing the fuel pressure regulator to change the fuel pressure and/or fuel flow to the fuel injectors).

Thus, a need exists for improved apparatuses and methods for containing fuel pressure regulators outside of the fuel tank and/or the fuel injector rail. A need also exists for tamper-proof apparatuses and methods for containing fuel pressure regulators.

SUMMARY

Apparatuses and methods for containing fuel pressure regulators are described herein. In some embodiments, an apparatus includes a first portion and a second portion. The first portion includes a mounting surface configured to support a mounting portion of a pressure regulator. The first portion defines a cavity configured to receive at least a portion of the pressure regulator, and an opening configured to provide fluid communication between the cavity and an area outside of the first portion. The second portion includes a mounting surface configured to support the mounting portion of the pressure regulator. The second portion defines a cavity and an opening configured to provide fluid communication between the cavity of the second portion and an area outside of the second portion. The second portion is configured to be coupled to the first portion to form a fluid-tight seal.

BRIEF DESCRIPTION OF THE DRAWINGS

FIG. 14 is a flow chart of a method according to an embodiment of the invention.

DETAILED DESCRIPTION

Figure 1:
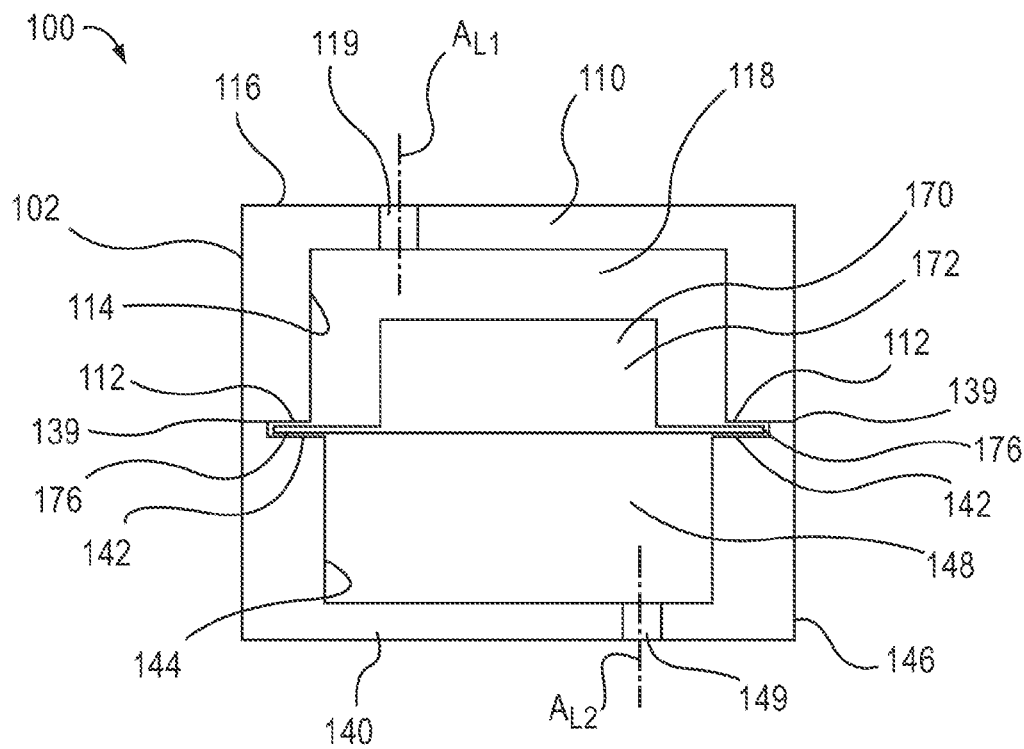
FIG. 1 is a schematic illustration of a fuel regulator assembly according to an embodiment of the invention.

In some embodiments, an apparatus includes a first portion and a second portion. The first portion includes a mounting surface configured to support a mounting portion of a pressure regulator. The pressure regulator can be, for example, a flow-through pressure regulator. The first portion defines a cavity configured to receive at least a portion of the pressure regulator, and an opening configured to provide fluid communication between the cavity and an area outside of the first portion. The second portion includes a mounting surface configured to support the mounting portion of the pressure regulator. The second portion defines a cavity and an opening configured to provide fluid communication between the cavity of the second portion and an area outside of the second portion. The second portion is configured to be coupled to the first portion to form a fluid-tight seal.

In some embodiments, an apparatus includes an inlet cover and an outlet cover. The inlet cover has an inner surface, a flange, and an inlet connector. The inner surface of the inlet cover defines a cavity configured to receive at least a portion of a fuel flow regulator, which can be, for example, a pressure regulator, a flow regulator and/or a damper. The flange of the inlet cover is configured to engage a mounting portion of the fuel flow regulator. The inlet connector defines a lumen in fluid communication with the cavity. The outlet cover has an inner surface, a flange and an outlet connector. The inner surface of the outlet cover defines a cavity. The outlet connector defines a lumen in fluid communication with the cavity of the outlet cover. The inlet cover is configured to be coupled to the outlet cover such that the lumen of the inlet connector is coaxial with the lumen of the outlet connector.

In some embodiments, an apparatus includes an inlet cover, an outlet cover and a fuel flow regulator. The fuel flow regulator has an inlet opening, at least one outlet opening and a flange. The inlet cover has an inner surface, a flange, and an inlet connector. The inner surface of the inlet cover defines a cavity within which at least a portion of the fuel flow regulator is received such that the inlet opening of the fuel flow regulator is in fluid communication with the cavity of the inlet cover. The inlet connector defines a lumen in fluid communication with the cavity. The outlet cover has an inner surface, a flange and an outlet connector. The inner surface of the outlet cover defines a cavity in fluid communication with the outlet opening of the fuel flow regulator. The outlet connector defines a lumen in fluid communication with the cavity of the outlet cover. The fuel flow regulator is disposed such that the flange of the fuel flow regulator is between the flange of the inlet cover and the flange of the outlet cover. The inlet cover is configured to be coupled to the outlet cover such that the lumen of the inlet connector is coaxial with the lumen of the outlet connector.

In some embodiments, a method includes disposing a fuel flow regulator within an inlet cover. The fuel flow regulator has a flange, an inlet opening and at least one outlet opening. The inlet cover has an inner surface defining a cavity, a flange, and an inlet connector defining a lumen in fluid communication with the cavity. The fuel flow regulator is disposed such that the flange of the fuel flow regulator is in contact with the flange of the inlet cover and the inlet opening is in fluid communication with the cavity defined by the inner surface of the inlet cover. An outlet cover is positioned against the inlet cover. The outlet cover has an inner surface defining a cavity, a flange, and an outlet connector defining a lumen in fluid communication with the cavity of the outlet cover. The outlet cover is positioned against the inlet cover such that the flange of the fuel flow regulator is in contact with the flange of the outlet cover, the outlet opening is in fluid communication with the cavity defined by the inner surface of the outlet cover, and a portion of the flange of the inlet cover matingly fits with a portion of the flange of the outlet cover. At least one of the inlet cover or the outlet cover is rotated such that the portion of the flange of the inlet cover and the portion of the flange of the outlet cover form a fluid-tight seal.

FIG. 1 is a schematic illustration of a fuel regulator assembly 100 according to an embodiment of the invention. The fuel regulator assembly 100 includes a container 102 and a fuel regulator 170. The container 102 has a first portion 110 and a second portion 140. The first portion 110 includes a mounting surface 112, an inner surface 114 and an outer surface 116. The inner surface 114 of the first portion 110 defines a cavity 118. The first portion 110 also defines an opening 119 having a longitudinal axis $A_{L1}$. The opening 119 of the first portion 110 provides fluid communication between the cavity 118 of the first portion 110 and an area outside of the first portion 110.

Similarly, the second portion 140 includes a mounting surface 142, an inner surface 144 and an outer surface 146. The inner surface 144 of the second portion 140 defines a cavity 148. The second portion 140 also defines an opening 149 having a longitudinal axis $A_{L2}$ that is offset from the longitudinal axis $A_{L1}$ of the opening 119 of the first portion 110. The opening 149 of the second portion 140 provides fluid communication between the cavity 148 of the second portion 140 and an area outside of the second portion 140. Although the longitudinal axis $A_{L2}$ of the opening 149 is shown as being substantially parallel to the longitudinal axis $A_{L1}$ of the opening 119, in other embodiments, the longitudinal axis $A_{L2}$ of the opening 149 can be angularly offset from the longitudinal axis $A_{L1}$ by a non-zero angle.

The container 102 is configured to contain the fuel regulator 170. The fuel regulator 170 can be, for example, a fuel pressure regulator, a fuel flow rate regulator, a damper and/or any regulator configured to regulate the characteristics of the fuel flow. In some embodiments, for example, the fuel regulator 170 can be a flow-through pressure regulator. As illustrated, the fuel regulator 170 is disposed within the container 102 such that the mounting surface 112 of the first portion 110 and the mounting surface 142 of the second portion 140 each support a mounting portion 176 of the fuel regulator 170, which can be, for example, a flange. Similarly stated, the fuel regulator 170 is disposed within the container 102 such that the mounting portion 176 of the fuel regulator 170 is disposed between and/or is cooperatively supported by the mounting surface 112 of the first portion 110 and the mounting surface 142 of the second portion 140.

Moreover, the fuel regulator 170 is disposed within the container 102 such that a portion 172 of the fuel regulator 170 is received within the cavity 118 of the first portion 110. The portion 172 of the fuel regulator 170 can be, for example, an inlet portion (i.e., the portion where fuel enters the fuel regulator 170) or an outlet portion (i.e., the portion where fuel exits the fuel regulator 170). Although the portion 172 of the fuel regulator 170 is shown as being spaced apart from the inner surface 114 of the first portion 110, in other embodiments, the portion 172 of the fuel regulator 170 can contact, engage and/or be supported by the inner surface 114 of the first portion 110.

The first portion 110 of the container 102 is coupled to the second portion 140 of the container 102 by a fluid-tight seal 139 (i.e., a seal that that substantially prevents a liquid and/or a gas from passing therethrough). In some embodiments, the fluid-tight seal 139 can be a hermetic seal (i.e., a seal that substantially prevents a gas from passing therethrough). The fluid-tight seal 139 can be formed by any suitable process, such as, for example, a weld, a chemical bond, a thermal bond, an interference fit or the like. In some embodiments, for example, the first portion 110 of the container 102 can be permanently coupled to the second portion 140 of the container 102 by a spin weld. In this manner, the container 102 can provide a leak-proof and a tamper-resistant containment for the fuel regulator 170.

Figure 2A:
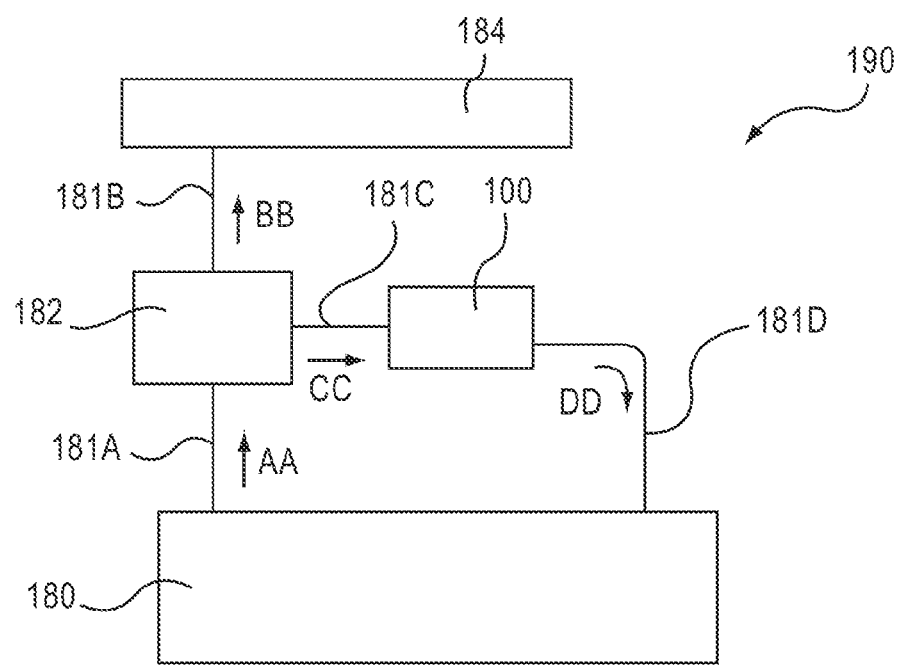
FIG. 2A is a schematic illustration of a fuel system according to an embodiment of the invention including the fuel regulator assembly shown in FIG. 1.

In some embodiments, the fuel regulator assembly 100 be can included within a fuel system in any suitable location, such as, for example, outside of the fuel tank. For example, FIG. 2A is a schematic illustration of a fuel system 190 according to an embodiment of the invention that includes the fuel regulator assembly 100. The fuel system 190 includes a fuel tank 180, a fuel pump 182, a fuel injector rail 184 and the fuel regulator assembly 100, each of which are interconnected by fuel lines 181A through 181D. The fuel pump 182 can be any suitable fuel pump, such as, for example, an electronic gear pump. Although the fuel pump 182 shown as being an in-line fuel pump (i.e., the fuel pump 182 is disposed outside of the fuel tank 180), in other embodiments, the fuel pump 182 can be disposed within the fuel tank 180.

The fuel injector rail 184 can be any suitable fuel injector rail. For example, in some embodiments the fuel injector rail 184 can be mounted to the cylinder head of an engine (not shown in FIG. 2A) and can include any number of fuel injectors (not shown in FIG. 2A). The fuel lines 181A through 181D can be any suitable line configured to convey fuel within the fuel system 190. For example, in some embodiments, the fuel lines 181A through 181D can be a rubber hose, a thermoplastic tubing (e.g., polyamide tubing, PTFE tubing, or the like), a hose containing a metallic braid, a composite fuel line, or the like. In some embodiments, for example, the fuel lines 181A through 181D can be a composite fuel line that includes a thermoplastic tubing covered by a rubber exterior. One example of such a composite fuel line is a composite fuel line manufactured by Pilot Industries under the trade name P-Cap™.

In use, the fuel pump 182 pumps fuel from the fuel tank 180 through fuel line 181A, as indicated by the arrow AA in FIG. 2A. Pressurized fuel from the outlet of the fuel pump 182 is conveyed to the fuel injector rail 184 through fuel line 181B, as indicated by the arrow BB. Pressurized fuel from the outlet of the fuel pump 182 is also conveyed to the fuel regulator assembly 100 through fuel line 181C, as indicated by the arrow CC. Because the fuel pump outlet is in fluid communication with both fuel line 181C and fuel line 181B, the flow to the fuel regulator assembly 100 is in parallel to the fuel flow to the fuel injector rail 184. Accordingly, when the fuel regulator assembly 100 regulates the characteristics of the fuel flow (e.g., the pressure and/or flow rate) through fuel line 181C, the characteristics of the fuel flow through fuel line 181B (i.e., the supply line to the fuel injector rail 184) are also regulated. Fuel from the outlet of the fuel regulator assembly 100 is returned to the fuel tank 180 by fuel line 181D, as indicated by arrow DD.

Although the fuel regulator assembly 100 is shown and described above as being coupled to fuel line 181C (i.e., the supply line) and fuel line 181D (i.e., the return line), in other embodiments the fuel regulator assembly 100 can be disposed in any suitable location within the fuel system 190. For example, in some embodiments, the fuel regulator assembly can be coupled directly to the fuel pump (i.e., without any intervening fuel line). In other embodiments, the fuel regulator assembly can be coupled directly to the fuel injector rail (i.e., without any intervening fuel line). In yet other embodiments, the fuel regulator assembly can be coupled to the fuel line between the fuel pump and the fuel injector rail. In yet other embodiments, a fuel system can include multiple fuel regulator assemblies.

Figure 2B:
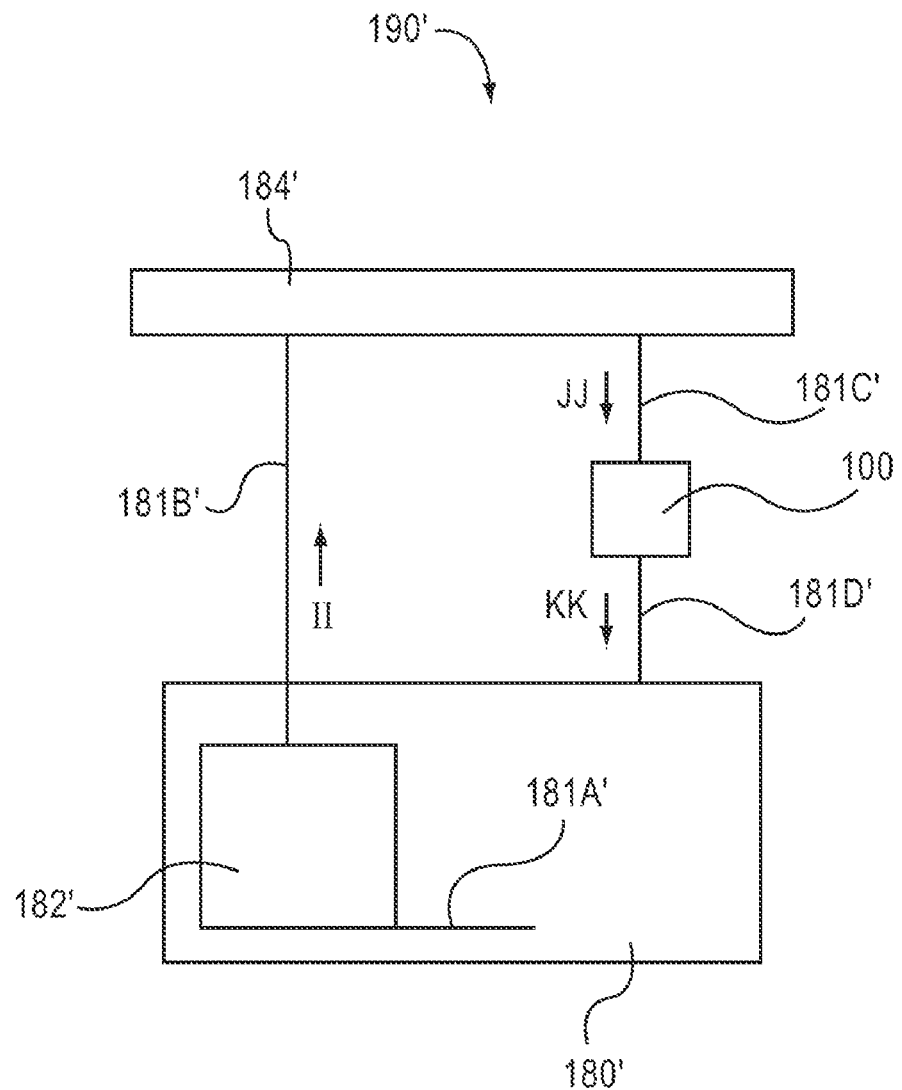
FIG. 2B is a schematic illustration of a fuel system according to an embodiment of the invention including the fuel regulator assembly shown in FIG. 1.

Although the fuel injector rail 184 is shown and described above as being a returnless rail, in some embodiments, a fuel injector rail can include an outlet through which excess fuel can be returned to a fuel tank. In some such embodiments, the fuel pressure and/or flow rate within the fuel injector rail can be regulated by regulating the characteristics of the return fuel. For example, FIG. 2B is a schematic illustration of a fuel system 190' according to an embodiment of the invention that includes the fuel regulator assembly 100. The fuel system 190' includes a fuel tank 180', a fuel pump 182' disposed within the fuel tank 180', a fuel injector rail 184' and the fuel regulator assembly 100. Each of the above-described fuel system components are interconnected by fuel lines 181B' through 181D', as described below.

In use, the fuel pump 182' draws fuel in from the fuel tank 180' through suction fuel line 181A'. Pressurized fuel from the outlet of the fuel pump 182' is conveyed to the fuel injector rail 184' through fuel line 181B', as indicated by the arrow II in FIG. 2B. Within the fuel injector rail 184' the desired amount of fuel is supplied to the fuel injectors (not shown in FIG. 2B). Excess fuel is conveyed from the fuel injector rail 184' to the fuel regulator assembly 100 through fuel line 181C', as indicated by the arrow JJ. Fuel from the outlet of the fuel regulator assembly 100 is returned to the fuel tank 180' by fuel line 181D', as indicated by arrow KK. In this manner, the fuel regulator assembly 100 can regulate the characteristics of the fuel flow (e.g., the pressure and/or flow rate) within the fuel injector rail 184' by regulating the characteristics of the fuel flow on the return side of the fuel system.

Figure 3:
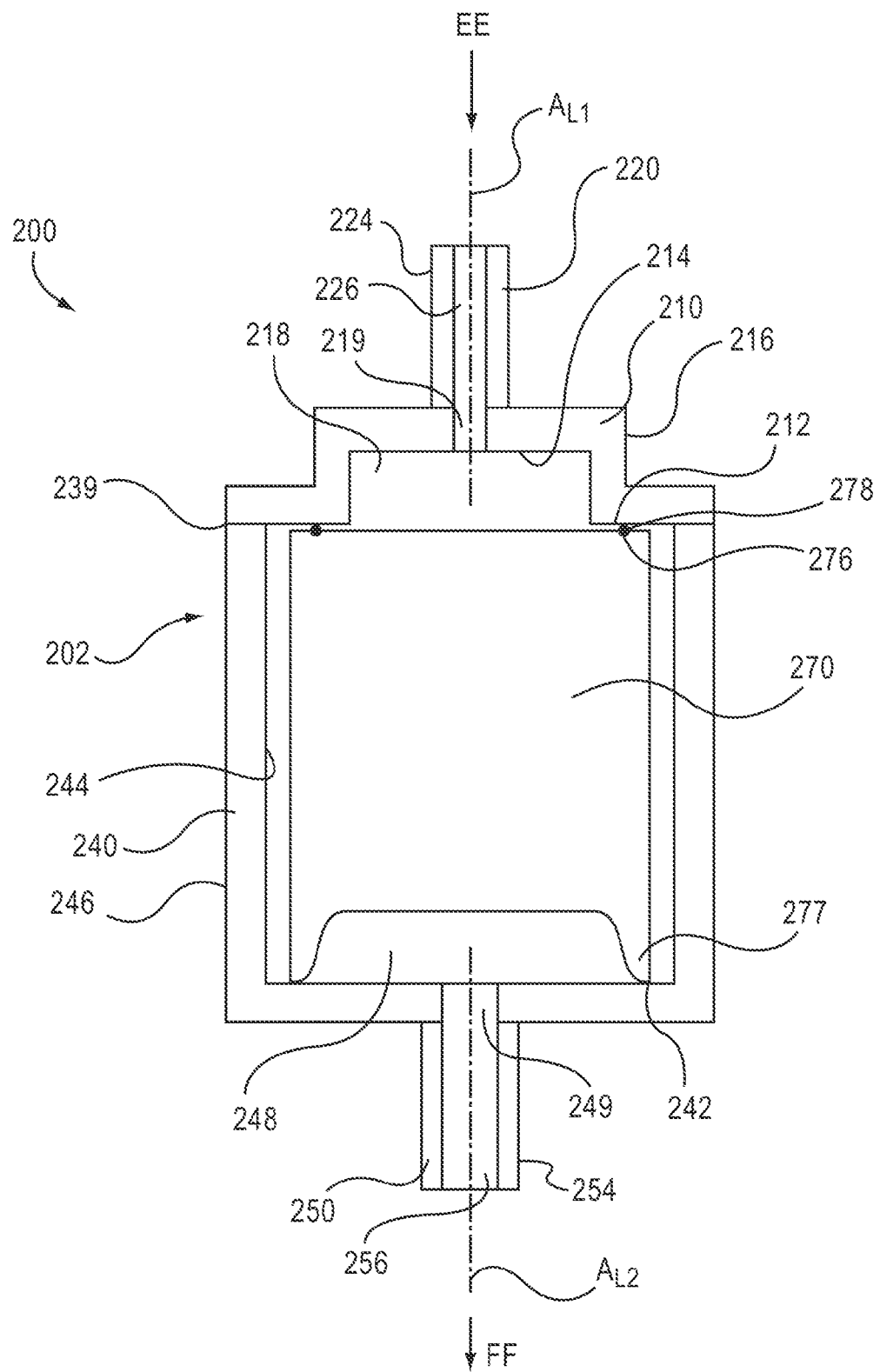
FIG. 3 is a schematic illustration of a fuel regulator assembly according to an embodiment of the invention.

Although the container 102 is shown and described above as including the opening 119 to provide fluid communication between the cavity 118 and an area outside the first portion 110 and the opening 149 to provide fluid communication between the cavity 148 and an area outside the second portion 140, in some embodiments, a container can include one or more fittings and/or connectors (e.g., fuel supply and/or return fittings) to provide fluid communication between the interior of the container and an area outside of the container. For example, FIG. 3 is a schematic illustration of a fuel regulator assembly 200 according to an embodiment of the invention.

The fuel regulator assembly 200 includes a container 202 and a fuel regulator 270. The container 202 has an inlet cover 210 and an outlet cover 240. The inlet cover 210 includes a mounting surface 212, an inner surface 214, an outer surface 216, and a fitting 220. The inner surface 214 of the inlet cover 210 defines a cavity 218. The inlet cover 210 also defines an opening 219. The fitting 220 has an outer surface 224 and defines a lumen 226 and a longitudinal axis $A_{L1}$. The fitting 220 is coupled to the outer surface 216 of the inlet cover 210 such that the opening 219 is in fluid communication with the lumen 226 and the cavity 218 defined by the inlet cover 210. The outer surface 224 of the fitting 220 can be adapted for connection within a fuel system (not shown in FIG. 3) in any suitable location. In this manner, the fuel regulator assembly 200 can be included within a fuel system and fuel can be conveyed to the fuel regulator 270 via the fitting 220, as shown by the arrow EE in FIG. 3.

The outlet cover 240 includes a mounting surface 242, an inner surface 244, an outer surface 246, and a fitting 250. The inner surface 244 of the outlet cover 240 defines a cavity 248. The outlet cover 240 also defines an opening 249. The fitting 250 has an outer surface 254 and defines a lumen 256 and a longitudinal axis $A_{L2}$. The fitting 250 is coupled to the outer surface 246 of the outlet cover 240 such that the opening 249 is in fluid communication with the lumen 256 and the cavity 248 defined by the outlet cover 240. Moreover, the fitting 250 is coupled to the outer surface 246 of the outlet cover 240 such that the longitudinal axis $A_{L2}$ is coaxial with the longitudinal axis $A_{L1}$. The outer surface 254 of the fitting 250 can be adapted for connection within a fuel system (not shown in FIG. 3) in any suitable location. In this manner, the fuel regulator assembly 200 can be included within a fuel system and fuel can be conveyed from the fuel regulator 270 via the fitting 250, as shown by the arrow FF in FIG. 3.

The container 202 is configured to contain the fuel regulator 270, which can be, for example, a flow-through pressure regulator. As illustrated, the fuel regulator 270 is disposed within the container 202 such that the mounting surface 212 of the inlet cover 210 contacts and/or supports a first mounting portion 276 of the fuel regulator 270 and the mounting surface 242 of the outlet cover 240 contacts and/or supports a second mounting portion 277 of the fuel regulator 270. The first mounting portion 276 of the fuel regulator 270 includes a seal 278. Accordingly, when the fuel regulator 270 is disposed within the container 202, the cavity 218 of the inlet cover 210 is fluidically isolated from the cavity 248 of the outlet cover 240. Moreover, the fuel regulator 270 is disposed within the container 202 such that a portion 274 of the fuel regulator 270 is received within the cavity 248 of the outlet cover 240. The portion 274 of the fuel regulator 270 can be, for example, an outlet portion (i.e., the portion where fuel exits the fuel regulator 270).

The inlet cover 210 of the container 202 is coupled to the outlet cover 240 of the container 202 by a fluid-tight seal 239. The fluid-tight seal 239 can be formed by any suitable process such as, for example, a weld, a chemical bond, a thermal bond, an interference fit or the like. In some embodiments, for example, the inlet cover 210 of the container 202 can be permanently coupled to the outlet cover 240 of the container 202 by a spin weld. In this manner, the container 202 can provide a leak-proof and a tamper-resistant containment for the fuel regulator 270.

Figures 4, 5:
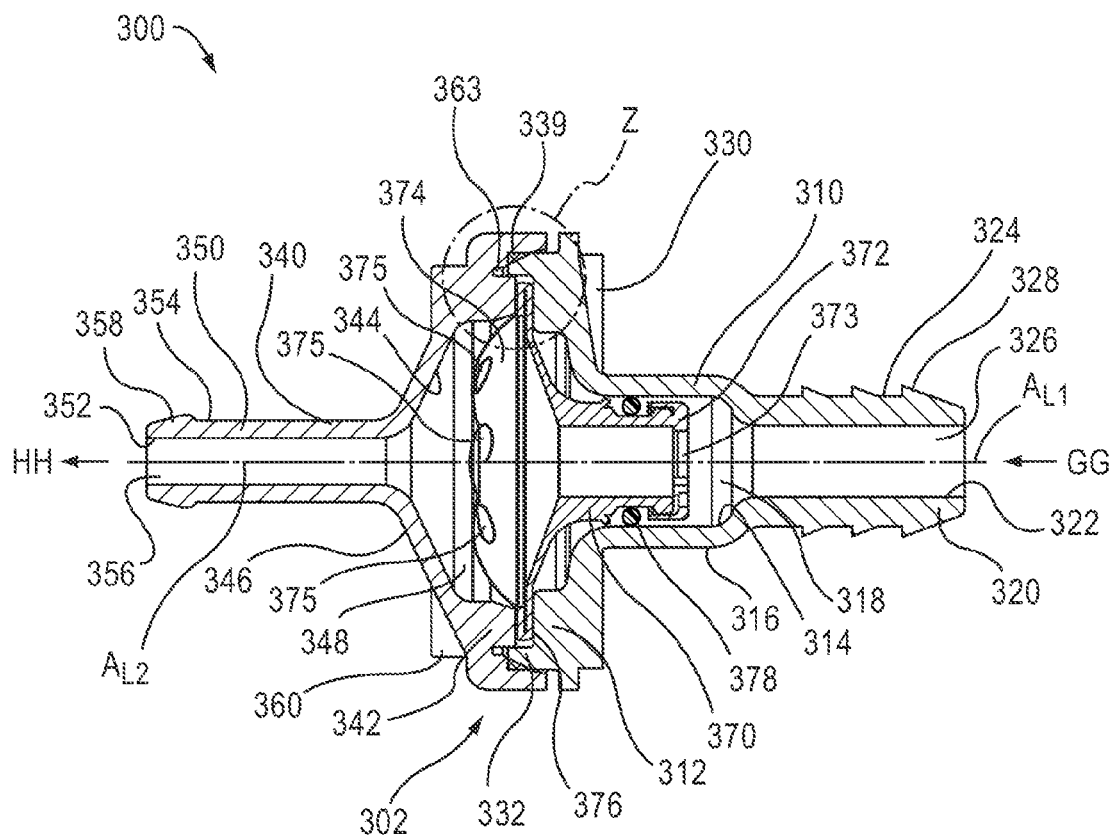
FIG. 4 is a cross-sectional front view of a fuel regulator assembly according to an embodiment of the invention.
FIG. 5 is a cross-sectional front view of a portion of the fuel regulator assembly shown in FIG. 4 labeled as Z in FIG. 4.
Figure 6:
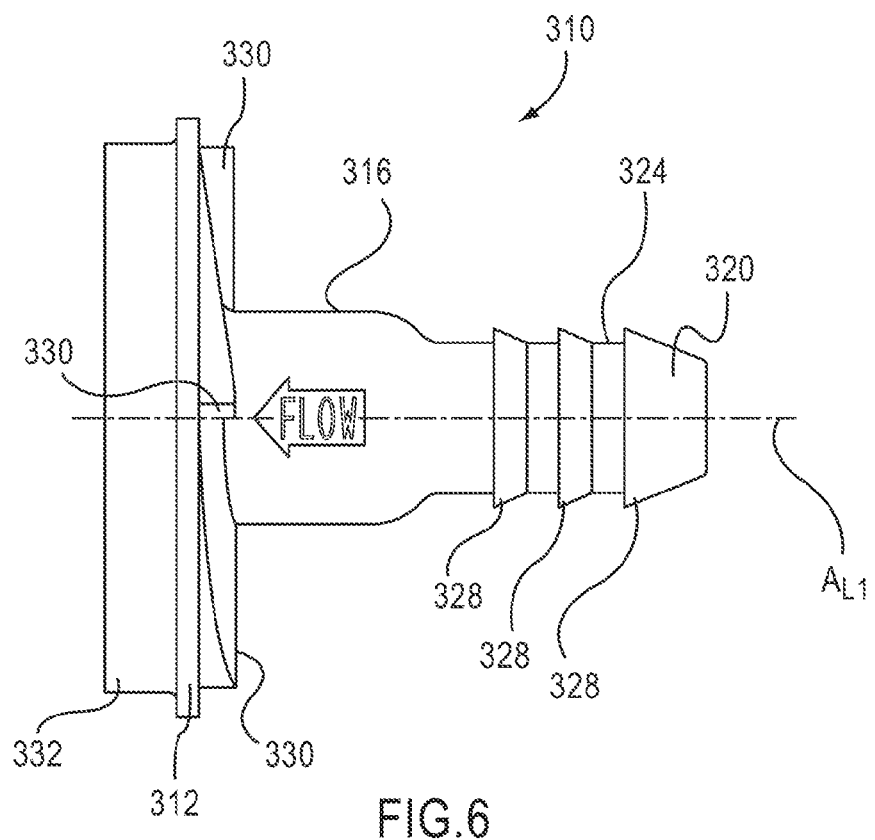
FIGS. 6 and 7 are a front view and a side view, respectively, of a portion of the fuel regulator assembly shown in FIG. 4.
Figure 7:
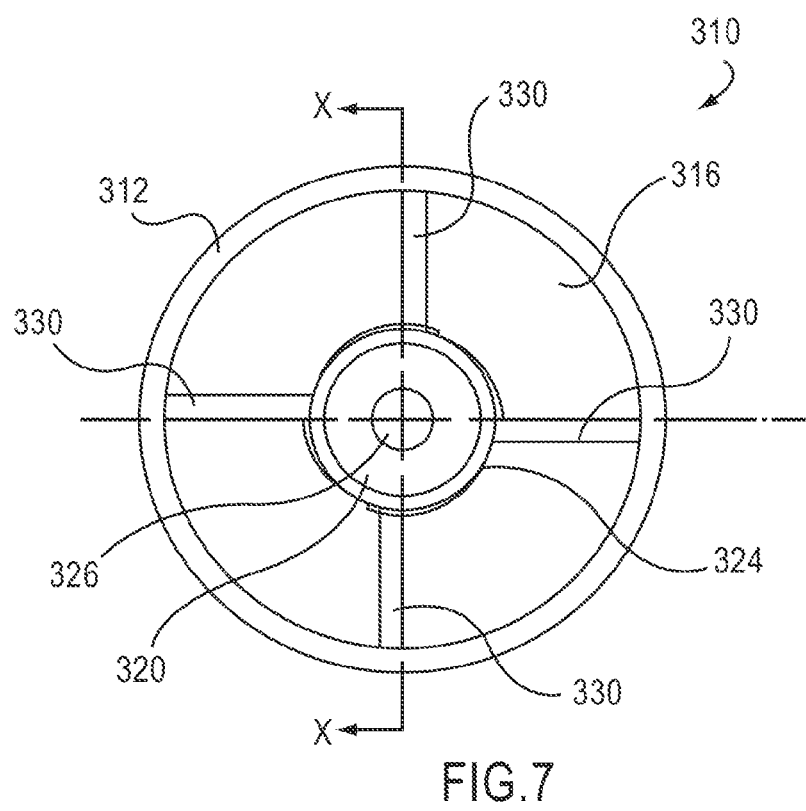
Figure 8:
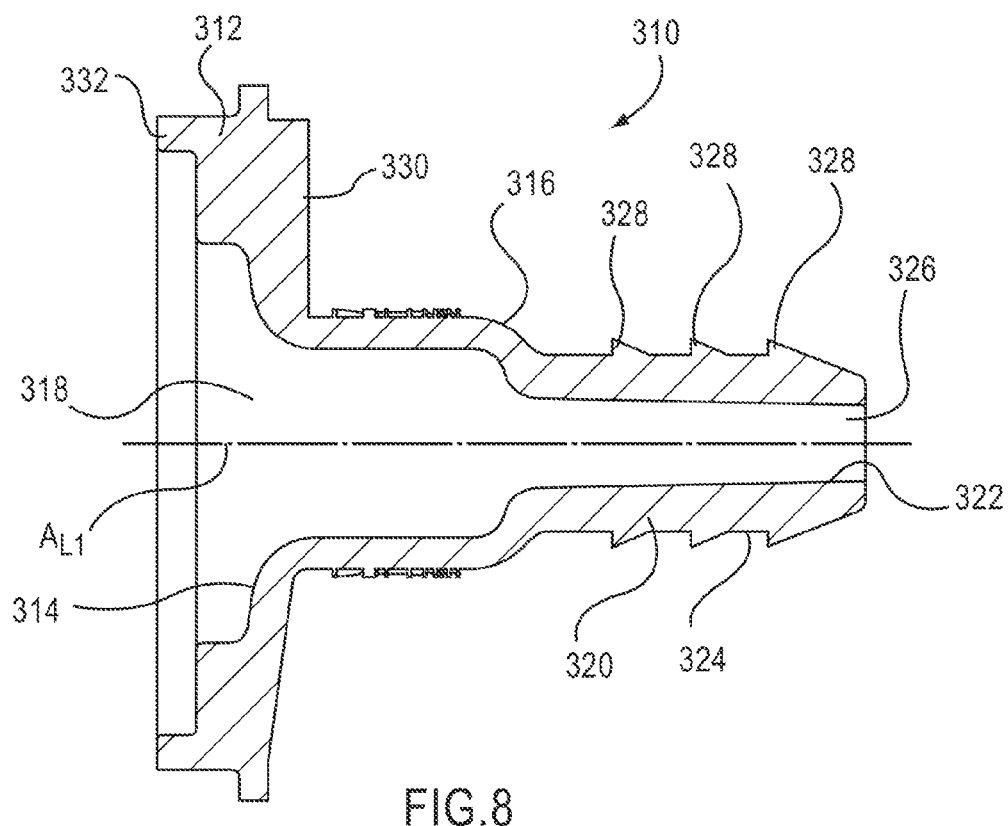
FIG. 8 is a cross-sectional front view of the portion of the fuel regulator assembly shown in FIGS. 6 and 7 taken along line X-X in FIG. 7.
Figure 9:
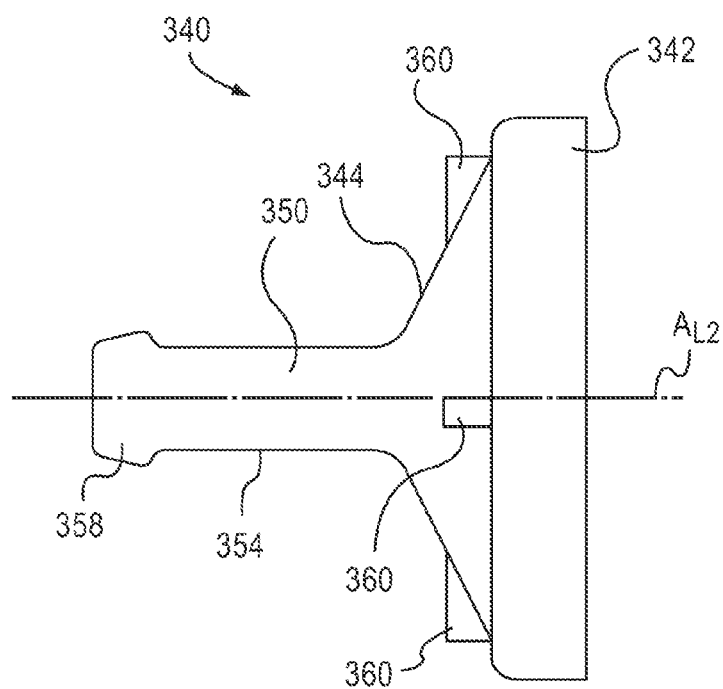
FIGS. 9 and 10 are a front view and a side view, respectively, of a portion of the fuel regulator assembly shown in FIG. 4.
Figure 10:
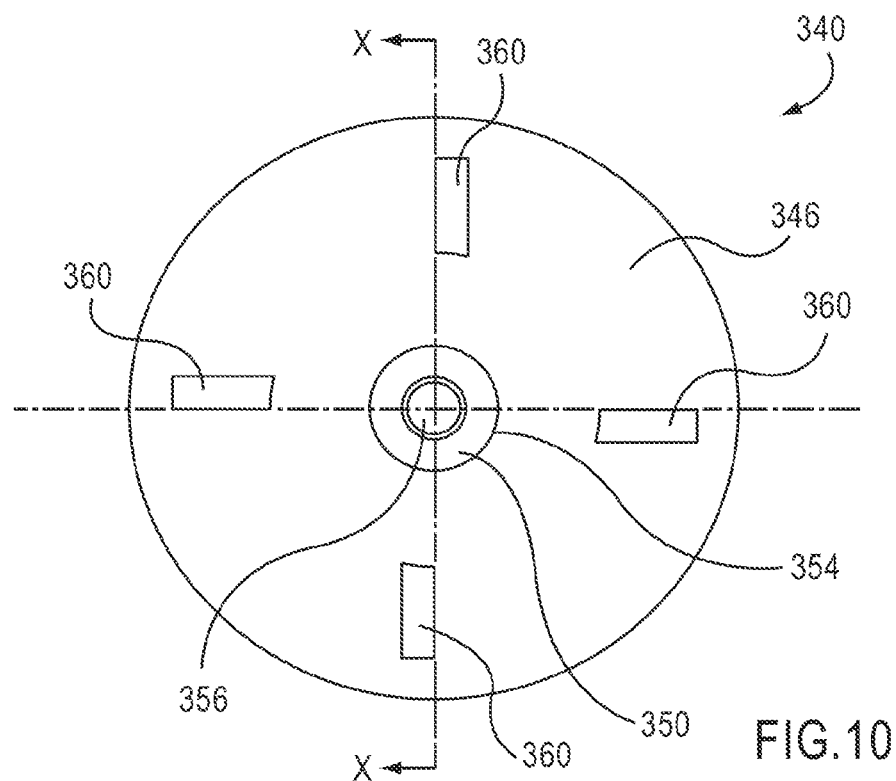
Figure 11:
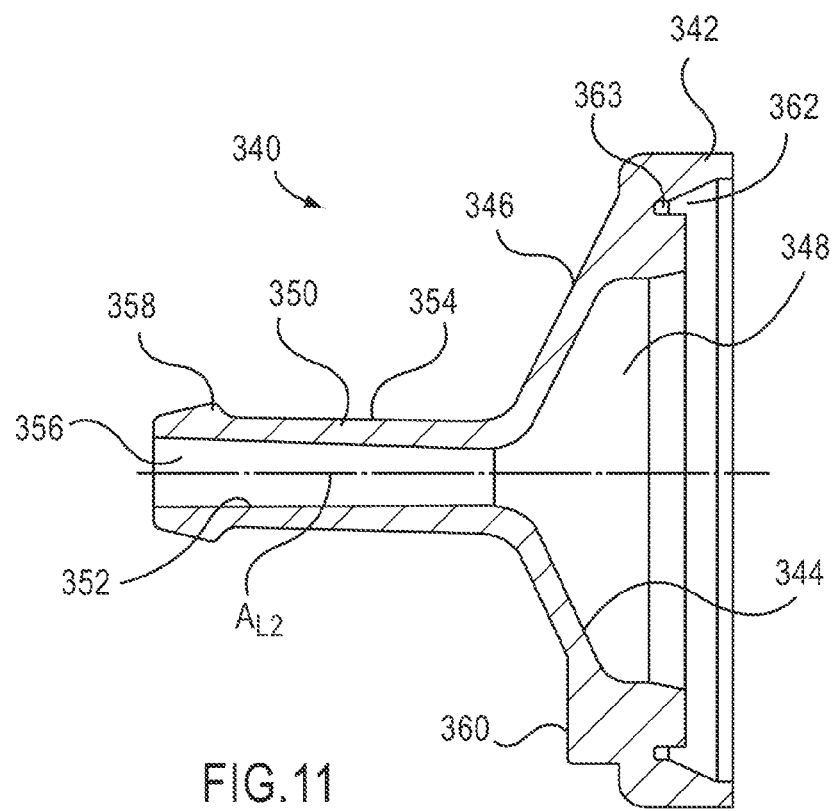
FIG. 11 is a cross-sectional front view of the portion of the fuel regulator assembly shown in FIGS. 9 and 10 taken along line X-X in FIG. 10.

FIG. 4 is a cross-sectional view of a fuel regulator assembly 300 according to an embodiment of the invention. The fuel regulator assembly 300 includes a container 302 and a fuel regulator 370. The container 302 has an inlet cover 310 and an outlet cover 340. FIGS. 6-8 show a front view, a side view and a front cross-sectional view, respectively, of the inlet cover 310. Similarly, FIGS. 9-11 show a front view, a side view and a front cross-sectional view, respectively, of the outlet cover 340.

The inlet cover 310 includes a flange 312, an inner surface 314, an outer surface 316, and a fitting portion 320. As shown in FIGS. 5 and 8, the flange 312 includes an annular protrusion 332. As described in more detail herein, the protrusion 332 is sized such that it can be matingly received within a recessed portion 362 of a flange 342 of the outlet cover 342. The inner surface 314 of the inlet cover 310 defines a cavity 318. The outer surface 316 of the inlet cover 310 is conically shaped and is disposed substantially symmetrically about the fitting portion 320. The outer surface 316 of the inlet cover 310 includes four protrusions 330 disposed symmetrically about the fitting portion 320 (see e.g., FIG. 7). As discussed in more detail herein, the protrusions 330 can be received within a fixture configured to rotate the inlet cover 310 and/or maintain a rotational position of the inlet cover 310 about a longitudinal axis $A_{L1}$ defined by the fitting portion 320 of the inlet cover 310.

The fitting portion 320 is a monolithically formed portion of the inlet cover 310 and has an outer surface 324 and an inner surface 322. The inner surface 322 defines a lumen 326 having a center line coaxial with the longitudinal axis $A_{L1}$. The lumen 326 is in fluid communication with the cavity 318 defined by the inlet cover 310. Accordingly, fuel can be conveyed to the fuel regulator 370 via the fitting portion 320, as shown by the arrow GG in FIG. 4. The outer surface 324 of the fitting portion 320 includes a series of barbs 328 configured to retain the fitting portion 320 within a fuel line of the types shown and described herein. In this manner, the inlet cover 310 of the container 302 can be connected within a fuel system (not shown in FIG. 4) in any suitable location, such as, for example, within a fuel supply line.

The outlet cover 340 includes a flange 342, an inner surface 344, an outer surface 346, and a fitting portion 350. As shown in FIGS. 5 and 11, the flange 342 of the outlet cover 340 includes an recessed portion 362 configured to matingly receive the protrusion 332 of the flange 312 of the inlet cover 310. In this manner, as described in more detail herein, the flange 312 of the inlet cover 310 and the flange 342 of the outlet cover 340 can be coupled together. The recessed portion 362 of the flange 342 also includes a flash trap 363 configured to receive flash, debris and/or excess material that can result when the flange 312 of the inlet cover 310 and the flange 342 of the outlet cover 340 are coupled together.

The inner surface 344 of the outlet cover 340 defines a cavity 348. The outer surface 346 of the outlet cover 340 is conically shaped and is disposed substantially symmetrically about the fitting portion 350 of the outlet cover 340. The outer surface 346 of the outlet cover 340 includes four protrusions 360 disposed symmetrically about the fitting portion 350 (see e.g., FIG. 10). As discussed in more detail herein, the protrusions 360 of the outlet portion 340 can be received within a fixture configured to rotate the outlet cover 340 and/or maintain a rotational position of the outlet cover 340 about a longitudinal axis $A_{L2}$ defined by the fitting portion 350 of the outlet cover 340.

The fitting portion 350 is a monolithically formed portion of the outlet cover 340 and has an outer surface 354 and an inner surface 352. The inner surface 352 defines a lumen 356 having a center line coaxial with the longitudinal axis $A_{L2}$. As shown in FIG. 4, the longitudinal axis $A_{L2}$ is coaxial with the longitudinal axis $A_{L1}$. The lumen 356 is in fluid communication with the cavity 348 defined by the outlet cover 340. Accordingly, fuel can be conveyed from the fuel regulator 370 via the fitting portion 350, as shown by the arrow HH in FIG. 4. The outer surface 344 of the fitting portion 350 includes a barb 358 configured to retain the fitting portion 350 within a fuel line of the types shown and described herein. In this manner, the outlet cover 340 of the container 402 can be connected within a fuel system (not shown in FIG. 4) in any suitable location, such as, for example, within a fuel supply line.

As shown in FIG. 4, the fuel regulator 370 includes an inlet portion 372, an outlet portion 374 and a flange 376. The inlet portion 372 includes an inlet opening 373 and an o-ring 378. The outlet portion 374 includes a set of outlet openings 375. The inlet opening 373 is disposed opposite the outlet openings 375 such that the fuel regulator 370 is a flow-through style regulator. Accordingly, in use, the fuel regulator 370 can regulate a characteristic of the fuel flow (e.g., the fuel pressure and/or flow rate) by controlling the amount of fuel that flows axially through the fuel regulator via the inlet opening 373 and the outlet openings 375.

The fuel regulator 370 is disposed within the container 302 such that the flange 376 of the fuel regulator 370 is disposed between the flange 312 of the inlet cover 310 and the flange 342 of the outlet cover 340. Said another way, the fuel regulator 370 is disposed within the container 302 such that the flange 376 of the fuel regulator 370 contacts and/or is supported by the flange 312 of the inlet cover 310 and the flange 342 of the outlet cover 340.

Additionally, the fuel regulator 370 is disposed within the container 302 such that the inlet portion 372 of the fuel regulator 370 is disposed within the cavity 318 of the inlet cover 310 and the outlet portion 374 of the fuel regulator 370 is disposed within the cavity 348 of the outlet cover 340. Said another way, the fuel regulator 370 is disposed within the container 302 such that the inlet opening 373 of the fuel regulator 370 is in fluid communication with the cavity 318 of the inlet cover 310 and the outlet opening 375 of the fuel regulator 370 is in fluid communication with the cavity 348 of the outlet cover 340. The o-ring 378 is disposed between the inlet portion 372 of the fuel regulator 370 and the inner surface 314 of the inlet cover 310 such that when the fuel regulator 370 is disposed within the container 302, the cavity 318 of the inlet cover 310 is fluidically isolated from the cavity 348 of the outlet cover 340. Although the fuel regulator 370 is shown and described as including an o-ring 378 to fluidically isolate the cavity 318 of the inlet cover 310 from the cavity 348 of the outlet cover 340, in other embodiments any suitable seal and/or combination of seals can be used to fluidically isolate the cavity 318 of the inlet cover 310 from the cavity 348 of the outlet cover 340

As discussed above, when the fuel regulator 370 is disposed within the container 302, flange 312 of the inlet cover 310 can be coupled to the flange 342 of the outlet cover 340 retain the fuel regulator 370 within the container 302. As shown in FIG. 5, the protrusion 332 of the flange 312 of the inlet cover 310 is received within the recessed portion 362 of the flange 342 of the outlet cover 340 to matingly couple the inlet cover 310 to the outlet cover 340. The inlet cover 310 and the outlet cover 340 are coupled together by a seal 339. In some embodiments, the seal 339 can be a fluid-tight seal (i.e., a seal that that substantially prevents a liquid and/or a gas from passing therethrough). In some embodiments, the seal 339 can be a hermetic seal (i.e., a seal that substantially prevents a gas from passing therethrough). In some embodiments, the seal 339 can be substantially permanent. Said another way, in some embodiments, the seal 339 is such that the inlet cover 310 and the outlet cover 340 cannot be decoupled without irreversibly breaking the seal 339. In this manner, the inlet cover 310 can be coupled to the outlet cover 340 such that the container 302 is leak-proof and/or tamper-resistant.

In some embodiments, the seal 339 can be formed by a weld, a chemical bond, a melt bond or the like. As discussed in more detail herein, in some embodiments, the seal 339 can be formed by a spin weld process. In other embodiments, the inlet cover 310 can be coupled to the outlet cover 340 without forming a distinct seal 339. For example, in some embodiments, the protrusion 332 of the flange 312 of the inlet cover 310 and the recess 362 of the flange 342 of the outlet cover 340 can cooperatively form an interference fit sufficient to couple the inlet cover 310 to the outlet cover 340.

The inlet cover 310 and the outlet cover 340 can be constructed of any material or combination of materials have suitable properties. Such properties can include, for example, strength, resistance to damage caused by vibration, heat resistance, chemical inertness (e.g., non-reactive with fuel), corrosion resistance and the like. In some embodiments, for example, the inlet cover 310 and/or the outlet cover 340 can be constructed from a metallic material, such as stainless steel. In other embodiments, the inlet cover 310 and/or the outlet cover 340 can be constructed from a polymer, such as, for example, Nylon. In yet other embodiments, the inlet cover 310 and/or the outlet cover 340 can be constructed from a composite material such as, for example, glass reinforced polyamide 12 (also known by the trade name Grilamid®).

Although the container 302 is shown and described above without reference to any specific dimensions, in some embodiments, the container 302 can have a length along the longitudinal axes $L_{A1}$ and $L_{A2}$ of approximately 80 mm (3.15 inches). Similarly, in some embodiments, the inlet cover 310 can have a length along the longitudinal axis $L_{A1}$ of approximately 45 mm (1.772 inches). In some embodiments, the outlet cover 340 can have a length along the longitudinal axis $L_{A2}$ of approximately 39 mm (1.535 inches).

In some embodiments, the flange 312 of the inlet cover 310 can have a diameter of between 40 mm and 50 mm (1.575 inches and 1.969 inches). In some embodiments, the flange 342 of the outlet cover 340 can have a diameter of between 40 mm and 50 mm (1.575 inches and 1.969 inches).

Figure 12:
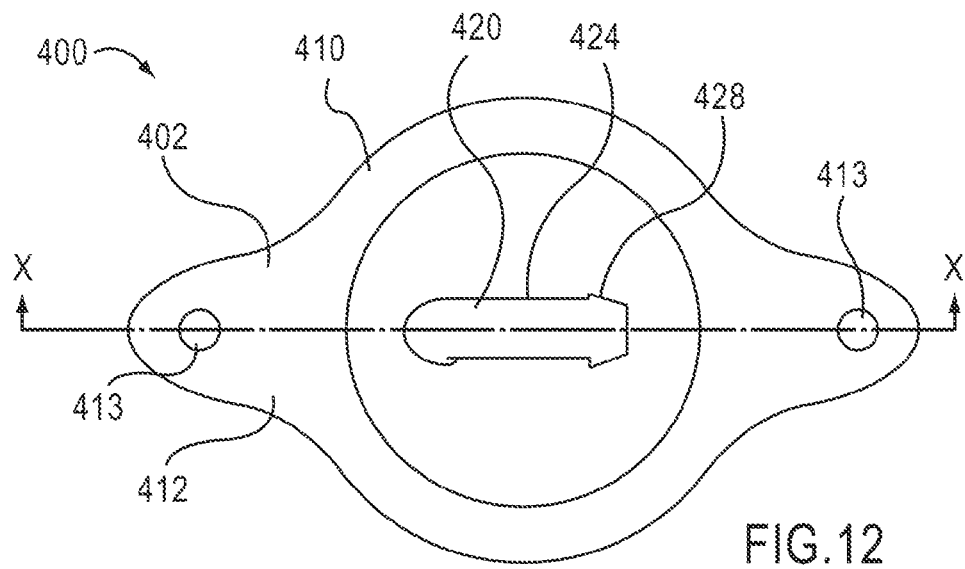
FIG. 12 is a plan view of a fuel regulator assembly according to an embodiment of the invention.
Figure 13:
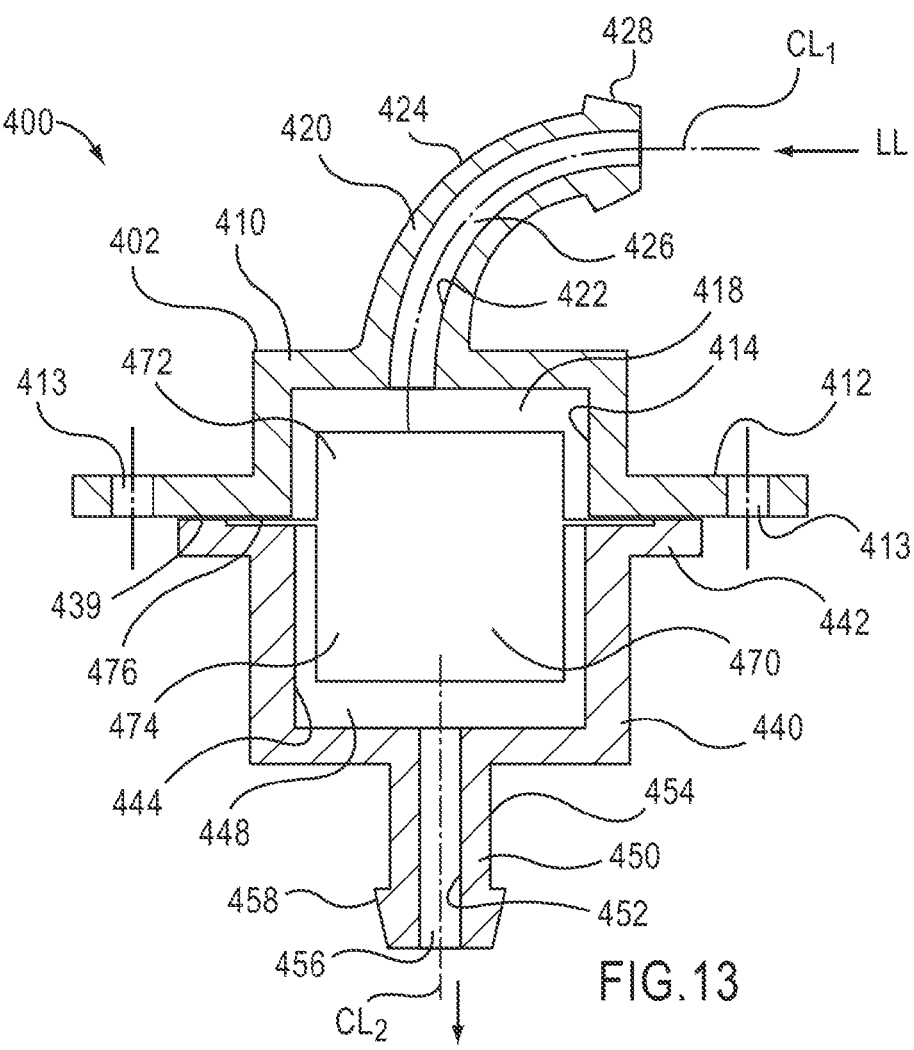
FIG. 13 is a cross-sectional front view of the fuel regulator assembly shown in FIG. 12 taken along line X-X in FIG. 12.

Although the fitting portion 320 is shown and described above as defining a longitudinal axis $A_{L1}$ that is coaxial with a longitudinal axis $A_{L2}$ defined by the fitting portion 350, in some embodiments, a container can include fitting portions that are angularly offset from each other. In other embodiments, a container can include a fitting portion that defines a curved and/or angled lumen. For example, FIGS. 12 and 13 show a top view and a cross-sectional view, respectively, of a fuel regulator assembly 400 according to an embodiment of the invention. The fuel regulator assembly 400 includes a container 402 and a fuel regulator 470.

Similar to the containers shown and described above, the container 402 has an inlet cover 410 and an outlet cover 440. The inlet cover 410 includes a flange 412, an inner surface 414 and a fitting portion 420. The inner surface 414 of the inlet cover 410 defines a cavity 418. The fitting portion 420 has an outer surface 424 and an inner surface 422. The inner surface 422 defines a lumen 426 having a curved center line $CL_1$. The lumen 426 is in fluid communication with the cavity 418 defined by the inlet cover 410. Accordingly, fuel can be conveyed to the fuel regulator 470 via the fitting portion 420, as shown by the arrow LL in FIG. 13.

The outer surface 424 of the fitting portion 420 includes a protrusion 428 configured to retain the fitting portion 420 within a fuel line of the types shown and described herein. In this manner, the inlet cover 410 of the container 402 can be connected within a fuel system (not shown in FIGS. 12 and 13) in any suitable location, such as, for example, within a fuel supply line. Although the fitting portion 420 can be used to mount and/or support the container 402 within a fuel system, the flange 412 of the inlet cover 410 includes mounting holes 413 that can be used to couple the fuel regulator assembly 400 in any suitable location and/or orientation within the fuel system. In some embodiments, for example, the mounting holes 413 can be used to couple the container 402 to a support bracket (not shown in FIGS. 12 and 13). In this manner, for example, the fuel regulator assembly 400 can be fluidically coupled to flexible fuel lines (not shown in FIGS. 12 and 13) and rigidly coupled to a bracket and/or other rigid support member.

Similarly, the outlet cover 440 includes a flange 442, an inner surface 444, and a fitting portion 450. The inner surface 444 of the outlet cover 440 defines a cavity 448. The fitting portion 450 has an outer surface 454 and an inner surface 452 that defines a lumen 456 having a linear center line $CL_2$. The lumen 456 is in fluid communication with the cavity 448 defined by the outlet cover 440. Accordingly, fuel can be conveyed from the fuel regulator 470 via the fitting portion 450, as shown by the arrow MM in FIG. 13. The outer surface 454 of the fitting portion 450 includes a protrusion 458 configured to retain the fitting portion 450 within a fuel line of the types shown and described herein. In this manner, the outlet cover 440 of the container 402 can be connected within a fuel system (not shown in FIGS. 12 and 13) in any suitable location, such as, for example, within a fuel supply line.

The fuel regulator 470 includes an inlet portion 472, an outlet portion 474 and a flange 476. The fuel regulator 470 is disposed within the container 402 such that the flange 476 of the fuel regulator 470 is disposed between the flange 412 of the inlet cover 410 and the flange 442 of the outlet cover 440. Said another way, the fuel regulator 470 is disposed within the container 402 such that the flange 476 of the fuel regulator 470 contacts and/or is supported by the flange 412 of the inlet cover 410 and the flange 442 of the outlet cover 440. Additionally, the fuel regulator 470 is disposed within the container 402 such that the inlet portion 472 of the fuel regulator 470 is disposed within the cavity 418 of the inlet cover 410 and the outlet portion 474 of the fuel regulator 470 is disposed within the cavity 448 of the outlet cover 440.

As discussed above, when the fuel regulator 470 is disposed within the container 402, flange 412 of the inlet cover 410 can be coupled to the flange 442 of the outlet cover 440 retain the fuel regulator 470 within the container 402. In this manner, the inlet cover 410 and the outlet cover 440 can be coupled together by a seal 439. In some embodiments, the seal 439 can be a fluid-tight seal (i.e., a seal that that substantially prevents a liquid and/or a gas from passing therethrough). In some embodiments, the seal 439 can be a hermetic seal (i.e., a seal that substantially prevents a gas from passing therethrough). In some embodiments, the seal 439 can be substantially permanent. Said another way, in some embodiments, the seal 439 is such that the inlet cover 410 and the outlet cover 440 cannot be decoupled without irreversibly breaking the seal 439. In this manner, the inlet cover 410 can be coupled to the outlet cover 440 such that the container 402 is leak-proof and/or tamper-resistant.

The components included in the fuel regulator assemblies shown and described above can be manufactured by any suitable method. For example, in some embodiments, an inlet cover and/or an outlet cover can be cast and/or machined from a metallic material. In other embodiments, an inlet cover and/or an outlet cover can be molded from a plastic material and/or a composite material. In some embodiments, an inlet cover and/or an outlet cover can each be monolithically constructed. In other embodiments, an inlet cover and/or an outlet cover can each be constructed by coupling multiple separate pieces together. For example, in some embodiments, an inlet cover can be constructed by coupling a fitting portion to a body portion.

Similarly, the fuel regulator assemblies shown and described above can be assembled by any suitable method. For example, FIG. 14 is a flow chart of a method 500 of assembling a fuel regulator assembly according to an embodiment of the invention. The illustrated method includes disposing a fuel flow regulator within an inlet cover such that a flange of the fuel flow regulator is in contact with a flange of the inlet cover and an inlet opening of the fuel flow regulator is in fluid communication with a cavity defined by the inlet cover, 502. The fuel flow regulator can be any fuel flow regulator as shown and described herein, such as, for example, fuel flow regulator 370 (see e.g., FIG. 4). Similarly, the inlet cover can be any inlet cover as shown and described herein, such as, for example, inlet cover 310 (see e.g., FIGS. 4-8).

An outlet cover is positioned against the inlet cover such that the flange of the fuel flow regulator is in contact with a flange of the outlet cover, an outlet opening of the fuel flow regulator is in fluid communication with a cavity defined by the outlet cover, and a portion of the flange of the inlet cover matingly fits with a portion of the flange of the outlet cover, 504. The outlet cover can be any outlet cover as shown and described herein, such as, for example, outlet cover 340 (see e.g., FIGS. 4-5 and 9-11).

At least one of the inlet cover or the outlet cover is rotated such that the portion of the flange of the inlet cover and the portion of the flange of the outlet cover form a fluid-tight seal, 506. In some embodiments, for example, the rotating includes spin-welding the portion of the flange of the inlet cover and the portion of the flange of the outlet cover to form a fluid-tight seal. For example, in some embodiments, the rotating includes disposing the inlet cover within a rotational fixture such that one or more protrusions disposed on an outer surface of the inlet cover are received within the rotational fixture. The protrusions can be, for example, similar to the protrusions 330 shown and described above with reference to FIGS. 6-8. The rotational fixture is then rotated such that the inlet cover is rotated relative to the outlet cover about a center line of the inlet connector. In this manner, for example, the inlet cover and the outlet cover can be coupled by a spin weld.

In some embodiments, the outlet cover can be similar to the outlet cover 340 and the inlet cover can be similar to the inlet cover 310, shown and described above. In such embodiments, the outlet cover can be positioned such that the outlet connector (e.g., the fitting portion 350 of the outlet cover 340) is facing downward and the inlet cover can be positioned such that the inlet connector (e.g., fitting portion 320 of the inlet cover 310) is facing upward before the rotating. Accordingly, when the inlet cover is rotated relative to the outlet cover about a center line of the inlet connector, any flash and/or debris generated during the rotation can flow downwardly into the flash trap (e.g., flash trap 363, shown and described above with reference to FIG. 5). In this manner, the inlet cover and the outlet cover can be joined without contaminating the fuel flow path defined therein.

In some embodiments, the rotating includes disposing the outlet cover within a rotational fixture such that one or more protrusions disposed on an outer surface of the outlet cover are received within the rotational fixture. The protrusions can be, for example, similar to the protrusions 360 shown and described above with reference to FIGS. 9-11. The rotational fixture is then rotated such that the outlet cover is rotated relative to the inlet cover about a center line of the outlet connector.

In some embodiments, the rotating includes rotating the inlet cover relative to the outlet cover through at least five revolutions. In other embodiments, the rotating includes rotating the inlet cover relative to the outlet cover through at least eight revolutions. In yet other embodiments, the rotating includes rotating the inlet cover relative to the outlet cover through at least fifteen revolutions. Similarly, in some embodiments, the rotating includes rotating the inlet cover relative to the outlet cover at a speed of between 1500 revolutions per minute and 2500 revolutions per minute. In other embodiments, the rotating includes rotating the inlet cover relative to the outlet cover at a speed of approximately 2000 revolutions per minute.

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Thus, the breadth and scope of the invention should not be limited by any of the above-described embodiments. While the invention has been particularly shown and described with reference to specific embodiments thereof, it will be understood that various changes in form and details may be made.

For example, although the flange 312 of the inlet cover 310 is shown and described as including a protrusion 332 configured to be matingly received within a recess 362 defined by the flange 342 of the outlet cover 340, in some embodiments, a flange of an inlet cover and a flange of an outlet cover can be matingly coupled by any suitable mechanism. For example, in some embodiments, a flange of an inlet cover can define a recess configured to receive a protrusion defined by a flange of an outlet cover.

Although the inlet cover 410 is shown and described above as including two mounting holes 413, in some embodiments the outlet cover can include one or more mounting holes. In other embodiments, the inlet cover and/or the outlet cover can include any suitable mounting mechanism. For example, in some embodiments, the inlet cover and/or the outlet cover can include a protrusion configured to be matingly received within a recess defined by a mounting structure (e.g., a bracket, a portion of a fuel injector rail, a portion of a fuel tank, or the like).

Although the fuel regulator assemblies are shown and described above as including one inlet passageway (e.g., fitting portion 320 shown and described above with reference to FIGS. 4 and 8) and one outlet passageway (e.g., fitting portion 350 shown and described above with reference to FIGS. 4 and 11), in some embodiments a fuel regulator assembly can have more than one inlet passageway and/or more than one outlet passageway. For example, in some embodiments, a fuel regulator can include a first cover having an inlet passageway and a first outlet passageway, and a second cover having a second outlet passageway. Such an arrangement can be used, for example, to provide a primary flow path (e.g., to a fuel injector rail) and a secondary flow path (e.g., a return flow to a fuel tank). In some embodiments, the inlet passageway and the first outlet passageway can be coaxially arranged, and the second outlet passageway can be angularly offset from the inlet passageway and the first outlet passageway by a nonzero angle. In other embodiments, a fuel regulator assembly can include a first cover having a first inlet passageway and an outlet passageway, and a second cover having a second inlet passageway.

What is claimed is:

1. An apparatus, comprising:
a fuel flow regulator having a mounting flange, an inlet portion and an outlet portion, the fuel flow regulator being a flow-through fuel flow regulator;
an inlet cover having an inner surface, a flange, and an inlet connector, the inner surface defining an inlet cavity within which the inlet portion of the fuel flow regulator is disposed such that the flange of the inlet cover engages the mounting flange of the fuel flow regulator, the flange of the inlet cover including a protrusion, the inlet connector defining a lumen in fluid communication with the inlet cavity; and
an outlet cover having an inner surface, a flange and an outlet connector, the inner surface of the outlet cover defining an outlet cavity, the flange of the outlet cover defining a recess, the outlet connector defining a lumen in fluid communication with the outlet cavity,
the flange of the inlet cover configured to be coupled to the flange of the outlet cover such that the inlet portion of the fuel flow regulator is within the inlet cavity and the outlet portion of the fuel flow regulator opens outwardly toward the outlet cavity,
the protrusion of the flange of the inlet cover disposed within the recess defined by the flange of the outlet cover to form a first fluid-tight seal, the inlet portion and the inner surface of the inlet cover collectively forming a second fluid-tight seal between the inlet cavity and the outlet cavity.

2. The apparatus of claim 1, wherein at least one of the inlet connector or the outlet connector includes a barb configured to be retained within a hose.

3. The apparatus of claim 1, wherein the flange of the inlet cover is configured to be permanently coupled to the flange of the outlet cover by any one of a spin weld, an ultrasonic weld, a laser weld, a vibration weld, a thermal bond, a radio frequency bond or a chemical bond.

4. The apparatus of claim 1, wherein:
an outer surface of the inlet cover includes a plurality of protrusions disposed symmetrically about the inlet connector, the plurality of protrusions configured to be received within a first fixture such that the inlet cover can be rotated about a center line of the lumen defined by the inlet connector by the first fixture; and
an outer surface of the outlet cover includes a plurality of protrusions disposed symmetrically about the outlet connector, the plurality of protrusions configured to be received within a second fixture such that the outlet cover can be rotated about a center line of the lumen defined by the outlet connector by the second fixture.

5. The apparatus of claim 1, wherein:
an outer surface of the inlet cover is substantially symmetrical about the inlet connector; and
an outer surface of the outlet cover is substantially symmetrical about the outlet connector.

6. The apparatus of claim 1, wherein:
the outlet portion of the fuel flow regulator is disposed within the outlet cavity such that the outlet portion of the fuel flow regulator is spaced apart from the inner surface of the outlet cover.

7. The apparatus of claim 1, wherein at least one of the flange of the inlet cover or the flange of the outlet cover includes a mounting portion configured to matingly fit with a mounting portion of a fuel system.

8. The apparatus of claim 1, wherein at least one of the flange of the inlet cover or the flange of the outlet cover includes an opening configured to receive a mounting portion of a fuel system.

9. The apparatus of claim 1, wherein:
the inlet cover and the outlet cover collectively define a longitudinal axis;
the protrusion of the flange of the inlet cover is an annular protrusion having a surface substantially parallel to the longitudinal axis; and
the flange of the outlet cover includes a surface that a defines the recess, the surface of flange of the outlet cover and the longitudinal axis defining an acute angle.

10. The apparatus of claim 1, wherein:
the recess defined by the flange of the outlet cover is a first recess; and
the flange of the outlet cover defines a second recess, the second recess configured to receive an excess material resulting when the flange the inlet cover is welded to the flange of the outlet cover.

11. An apparatus, comprising:
an inlet housing having an inner surface, a flange and an inlet connector defining an inlet lumen, the inner surface defining an inlet cavity in fluid communication with the inlet lumen, the flange of the inlet housing including a protrusion;
a flow-through regulator having an inlet portion and an outlet portion opposite the inlet portion, the flow-through regulator disposed within the inlet cavity such that an opening defined by the inlet portion is substantially aligned with the inlet lumen, and the inlet portion and the inner surface of the inlet housing collectively form a first fluid-tight seal; and
an outlet housing having an inner surface, a flange and an outlet connector defining an outlet lumen, the inner surface of the outlet housing defining an outlet cavity in fluid communication with the outlet lumen, the flange of the outlet housing including a surface defining, at least in part, a first recess and a second recess,
the outlet housing coupled to the inlet housing such that the protrusion of the flange of the inlet housing is disposed within the first recess defined by the surface of the flange of the outlet housing to define a second fluid-tight seal, and the outlet portion of the flow-through regulator is disposed apart from the inner surface of the outlet housing, the second recess configured to receive an excess material resulting when the protrusion is welded to the surface of the flange of the outlet housing.

12. The apparatus of claim 11, wherein:
the surface of the flange of the outlet housing is a first surface;
the inlet housing and the outlet housing collectively define a longitudinal axis;
the protrusion of the flange of the inlet housing has a second surface that is substantially parallel to the longitudinal axis; and
the first recess defined by the first surface is an annular cavity within which the protrusion is disposed to form the second fluid-tight seal, the first surface being offset from the longitudinal axis by an acute angle.

13. The apparatus of claim 11, wherein the first fluid-tight seal fluidically isolates the inlet cavity and the outlet cavity.

* * * * *